(12) United States Patent
Tanaka et al.

(10) Patent No.: US 7,376,753 B2
(45) Date of Patent: May 20, 2008

(54) TERMINAL DEVICES SYNCHRONIZING METHOD COMMUNICATION SYSTEM AND TERMINAL DEVICE

(75) Inventors: Tetsuya Tanaka, Tokyo (JP); Kenji Hoshino, Abiko (JP)

(73) Assignee: Sega Corporation (JP)

( * ) Notice: Subject to any disclaimer, the term of this patent is extended or adjusted under 35 U.S.C. 154(b) by 636 days.

(21) Appl. No.: 10/020,892

(22) Filed: Dec. 19, 2001

(65) Prior Publication Data
US 2002/0129169 A1  Sep. 12, 2002

(30) Foreign Application Priority Data
Mar. 9, 2001  (JP)  ............... 2001-066506

(51) Int. Cl.
*G06F 15/16* (2006.01)
(52) U.S. Cl. ............. 709/248; 370/503; 463/40; 463/41; 463/42
(58) Field of Classification Search ............ 709/248; 370/503; 463/40–42
See application file for complete search history.

(56) References Cited

U.S. PATENT DOCUMENTS

| | | | |
|---|---|---|---|
| 4,089,524 A * | 5/1978 | Hauck ............... 463/15 |
| 4,253,116 A * | 2/1981 | Rodgers, III ......... 348/545 |
| 4,516,035 A * | 5/1985 | Rhoads et al. ....... 307/66 |
| 4,803,553 A * | 2/1989 | Schrock et al. ...... 348/516 |
| 5,738,583 A | 4/1998 | Comas et al. |
| 5,775,996 A | 7/1998 | Othmer et al. |
| 5,900,914 A * | 5/1999 | Niijima ............... 348/521 |
| 6,183,367 B1 | 2/2001 | Kaji et al. |
| 6,262,996 B1 * | 7/2001 | Kainulainen et al. ..... 370/503 |
| 6,306,039 B1 * | 10/2001 | Kaji et al. ............ 463/42 |
| 6,447,396 B1 * | 9/2002 | Galyean et al. ........ 463/40 |
| 6,590,908 B1 * | 7/2003 | Harasaki et al. ....... 370/508 |
| 6,795,124 B1 * | 9/2004 | Gamo et al. .......... 348/525 |
| 2002/0069299 A1* | 6/2002 | Rosener et al. ........ 709/248 |

FOREIGN PATENT DOCUMENTS

| | | |
|---|---|---|
| EP | 0 143 527 A2 | 6/1985 |
| EP | 0 144 801 A2 | 6/1985 |
| EP | 0 873 772 A1 | 10/1998 |

\* cited by examiner

*Primary Examiner*—Bunjob Jaroenchonwanit
*Assistant Examiner*—Duyen M Doan
(74) *Attorney, Agent, or Firm*—Dickstein Shapiro LLP (57) ABSTRACT

A plurality of terminal devices, e.g., game apparatuses 2 are interconnected to each other through a network 4. The respective game apparatuses 2 receive signals inputted from the outside, e.g., television signals broadcast from a broadcasting antenna and extract synchronizing signals from the broadcasting signals. Based on the extracted synchronizing signals, the respective game apparatuses 2 make synchronization control of operations, data communication among the respective game apparatuses 2. The respective game apparatuses 2 use the common signals to make the synchronization control, whereby the respective game apparatuses 2 can be synchronized with one another suitably without timing shift. The terminal devices synchronizing method can suitably synchronize timings of communication among a plurality of terminal devices.

7 Claims, 10 Drawing Sheets

TERMINAL DEVICES SYNCHRONIZING METHOD COMMUNICATION SYSTEM AND TERMINAL DEVICE

BACKGROUND OF THE INVENTION

The present invention relates to a terminals synchronizing method for synchronizing a plurality of terminals interconnected by a communication line. The present invention relates to a communication system including a plurality of terminals interconnected by a communication line. Furthermore, the present invention relates to terminal devices interconnected by a communication line.

Recently, games played through communication line (such games will be hereinafter called network games) are noted. Network games in which car races are competed by a plurality of game players on a plurality of game apparatuses installed side by side in game centers or others and interconnected to one another through communication line are known as popular games.

Figure 10:
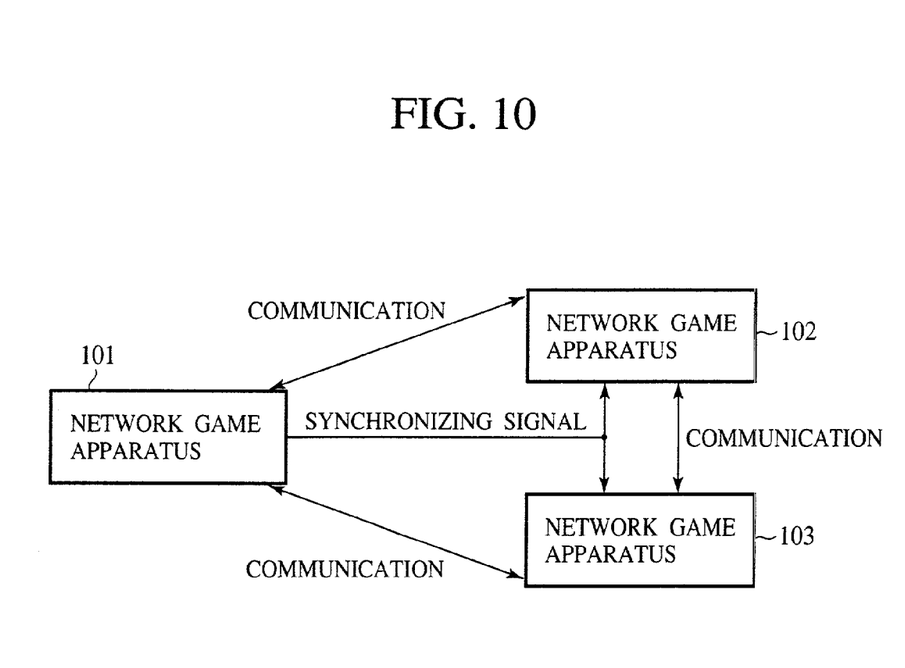
FIG. 10 is a bock diagram of the conventional communication game system.

In a case of game apparatuses installed side by side in a game center or others, as shown in FIG. 10, a plurality of network game apparatuses 101, 102, 103 are interconnected directly to one another by a cable, and one, e.g., the network game apparatus 101, of the network game apparatuses 101, 102, 103 is a host. The host network game apparatus 101 supplies synchronizing signals to the rest network game apparatuses 102, 103, and the rest network game apparatuses 102, 103 time a start of game processing with the synchronizing signals. The network game apparatuses 101, 102, 103, which are installed near one another, have little delay due to interconnection by the cable, and good synchronizing control can be realized.

Recently especially noted are network games played on game apparatuses geographically spaced from one another by connecting the game apparatuses to networks, such as interest, etc., through communication line, such as telephone line. Furthermore are proposed network games which will be played by connecting not only game apparatuses installed in game centers, etc. but also domestic game apparatuses to networks.

However, in a case of geographically spaced game apparatuses, delays of the communication line, the networks, etc. are large, which makes it impossible to use the above-described method to synchronize the game apparatuses with the host game apparatus.

Accordingly, in network games by connecting geographically spaced game apparatuses to networks, the respective game apparatus make data processing and image processing in synchronization with signals of their own transmitters. Also in communicating with the rest game apparatuses and the center, the respective game apparatuses communicate at a certain interval (1 int) with respect to a signal of their own transmitters. The respective game apparatuses take in data supplied by the rest game apparatuses to make data processing and image processing.

However, the transmitters of the respective game apparatuses have errors with respect to the transmitters of the rest game apparatuses, and the respective game apparatuses have communication intervals different from one another. Resultantly, when the errors are accumulated, the respective game apparatuses cannot receive data from the respective game apparatuses and cannot make data processing and image processing. Thus, even when high-speed data communication is realized, for games requiring precise timing control, suitable game processing cannot be made due to the timing offset.

An object of the present invention is to provide a method for synchronizing terminals which can suitably synchronize timings of communication among a plurality of terminals.

Another object of the present invention is to provide a communication system which can suitably synchronize timings of the communication among a plurality of terminals.

Further another object of the present invention is to provide a terminal device which can synchronize communication timings.

SUMMARY OF THE INVENTION

Figure 1:
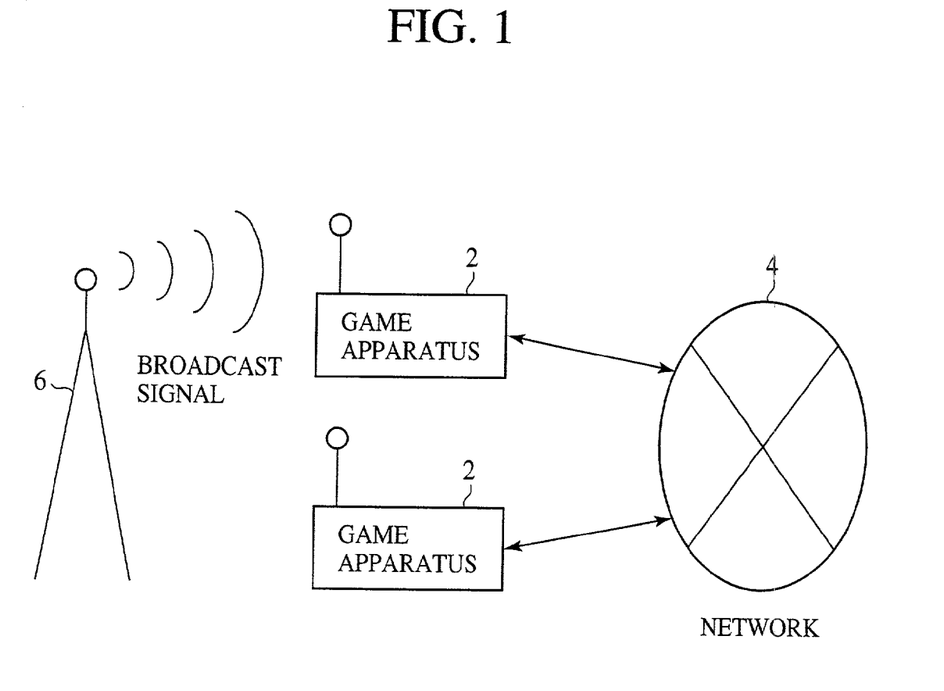
FIG. 1 is a view of a principle of the present invention.

The principle of the present invention will be explained with reference to FIG. 1.

A plurality of terminals, e.g., game apparatuses 2, are interconnected to each other through a network 4 The respective game apparatuses 2 receive signals inputted from the outside, e.g., television signals broadcasted from a broadcasting antenna 6, and extract a synchronizing signal from the broadcast signals. Based on the extracted synchronizing signal, the respective game apparatuses 2 synchronize operations with the rest game apparatuses 2 and make data communication between the respective game apparatuses 2. Based on the common signal, the respective game apparatuses 2 are synchronized with each other. Accordingly, the respective game apparatuses 2 have no communication timing offset with respect to each other, and can suitably synchronized with each other.

The above-described object is achieved by a terminal devices synchronizing method for synchronizing a plurality of terminal devices interconnected through a network, the respective terminal devices making synchronization control of operations, and data communication among the respective terminal devices, based on synchronizing signals extracted from signals inputted from the outside other than the respective terminal devices.

In the above-described terminal devices synchronizing method, it is preferable that the respective terminal devices make the synchronization control of the data processing among the respective terminal devices, based on synchronizing signals extracted from either of broadcasting signals, time reference signals and an a.c. power source.

In the above-described terminal devices synchronizing method it is preferable that the respective terminal devices make the synchronization control, based on synchronizing signals extracted from broadcasting signals of the same channel.

In the above-described terminal devices synchronizing method it is preferable that when it is difficult to extract the synchronizing signals from the broadcasting signals in one of the respective terminal devices, the channel of the broadcasting signals is changed.

The above-described object is achieved by a communication system comprising a plurality of terminal devices interconnected through a communication line, wherein the respective terminal devices make synchronization control by a terminal synchronizing method, the terminal devices synchronizing method synchronizing the terminal devices interconnected through the communication line, the respective terminal devices making synchronization control of operations, and data communication among the respective terminal devices, based on synchronizing signals extracted from signals inputted from the outside other than the respective terminal devices.

The above-described object is achieved by a terminal device interconnected to another terminal device through a network, the terminal device comprising: synchronizing signal generating means for generating synchronizing respective from signals inputted from the outside other than the terminal device; and control means for making synchronization control operations and data communication, based on the synchronizing signals.

In the above-described terminal devices synchronizing method it is preferable that the synchronizing signal generating means generates synchronizing signals from broadcasting signals, time reference signals or an a.c. power source.

In the above-described terminal devices synchronizing method it is preferable that the terminal devices further comprises means for supplying synchronizing signals when said synchronizing signals cannot be generated from the signals inputted from the outside.

DETAILED DESCRIPTION OF THE INVENTION

Figure 2:
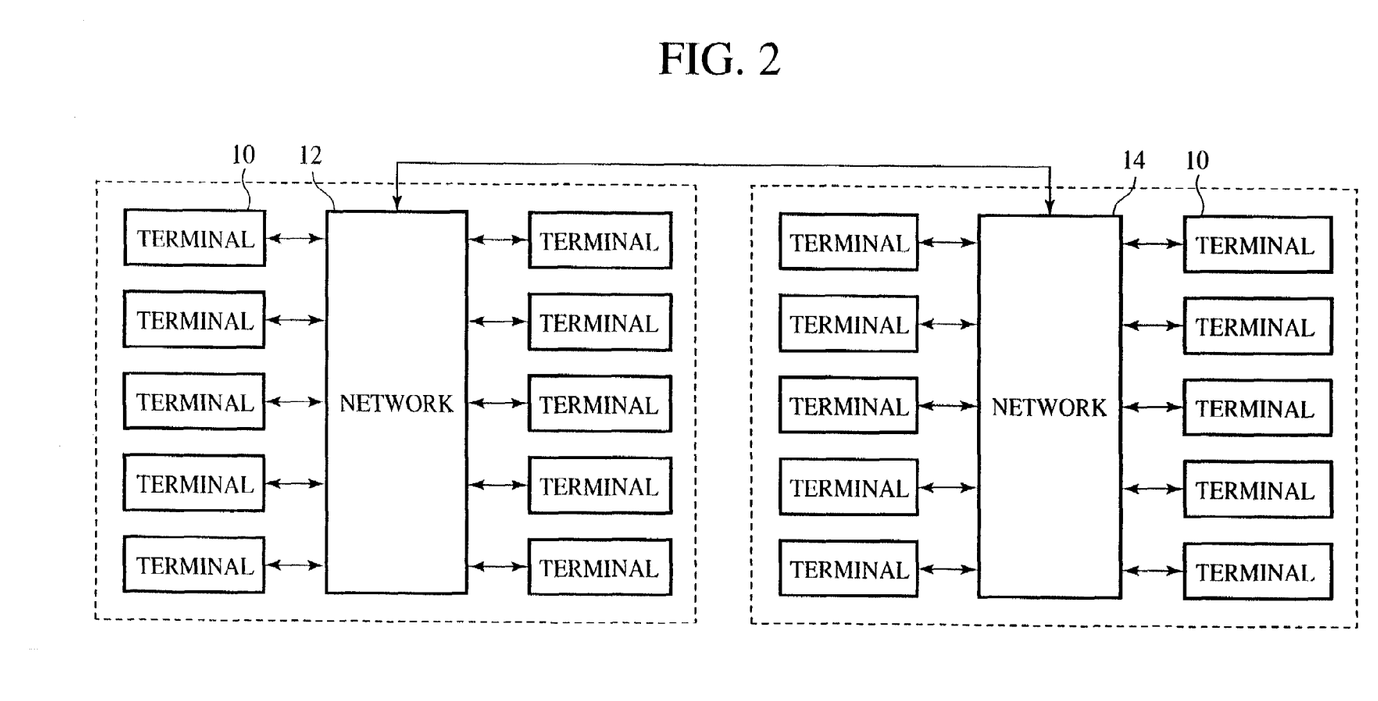
FIG. 2 is a block diagram of the communication system according to one embodiment of the present invention.
Figure 3:
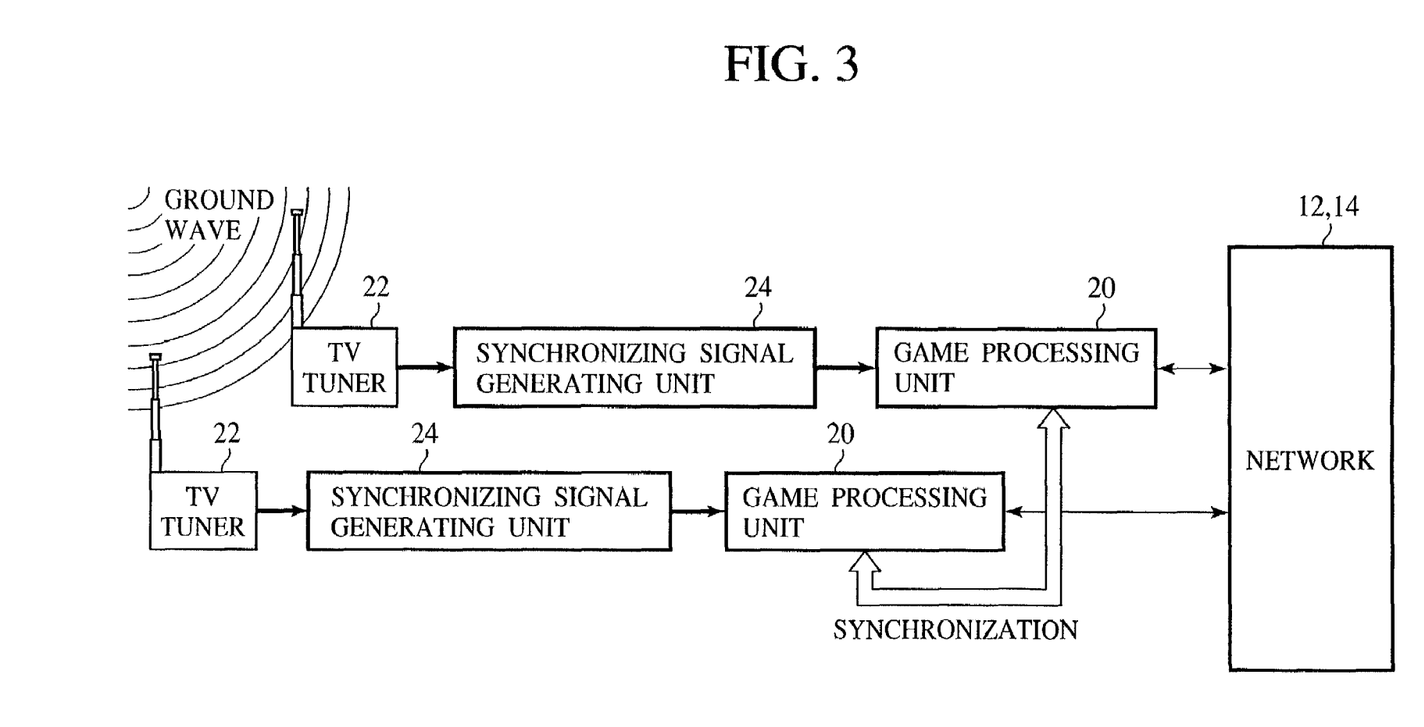
FIG. 3 is a block diagram of the terminal device of the communication system according to the embodiment of the present invention.
Figure 4:
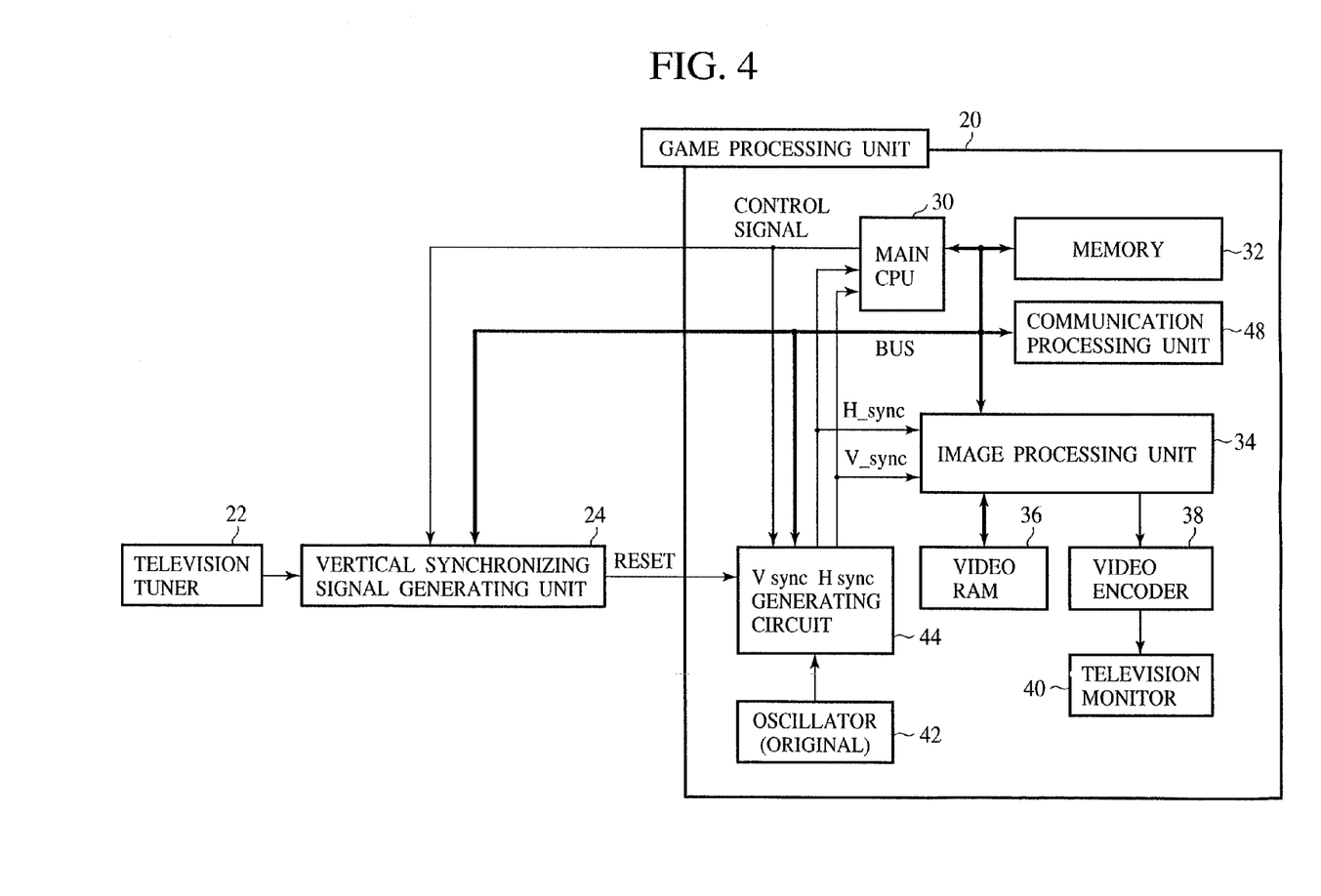
FIG. 4 is a block diagram detailing the terminal device of the communication system according to the embodiment of the present invention.
Figure 5:
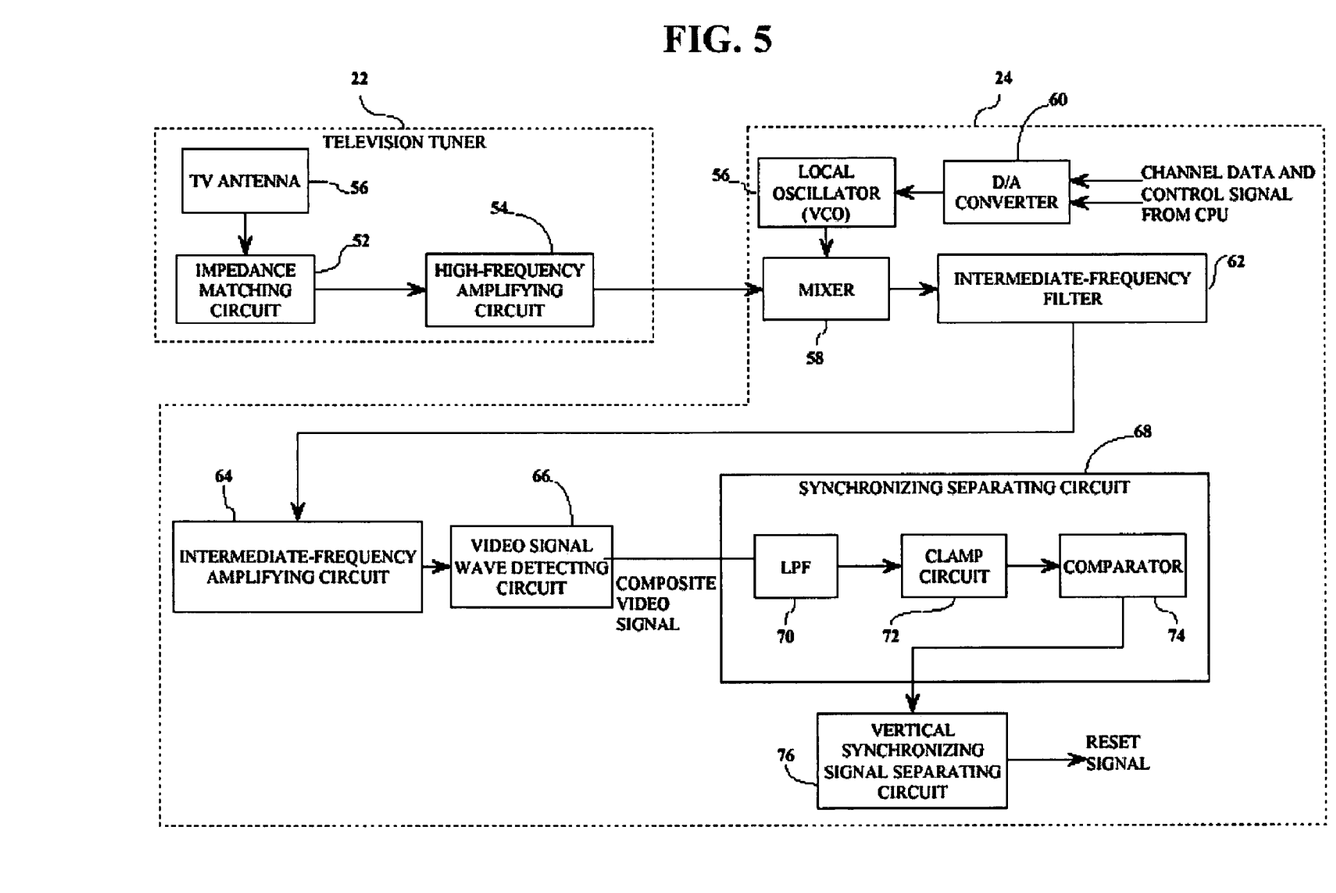
FIG. 5 is a block diagram of the vertical synchronizing signal generating units of the communication system according to the embodiment of the present invention.
Figure 6:
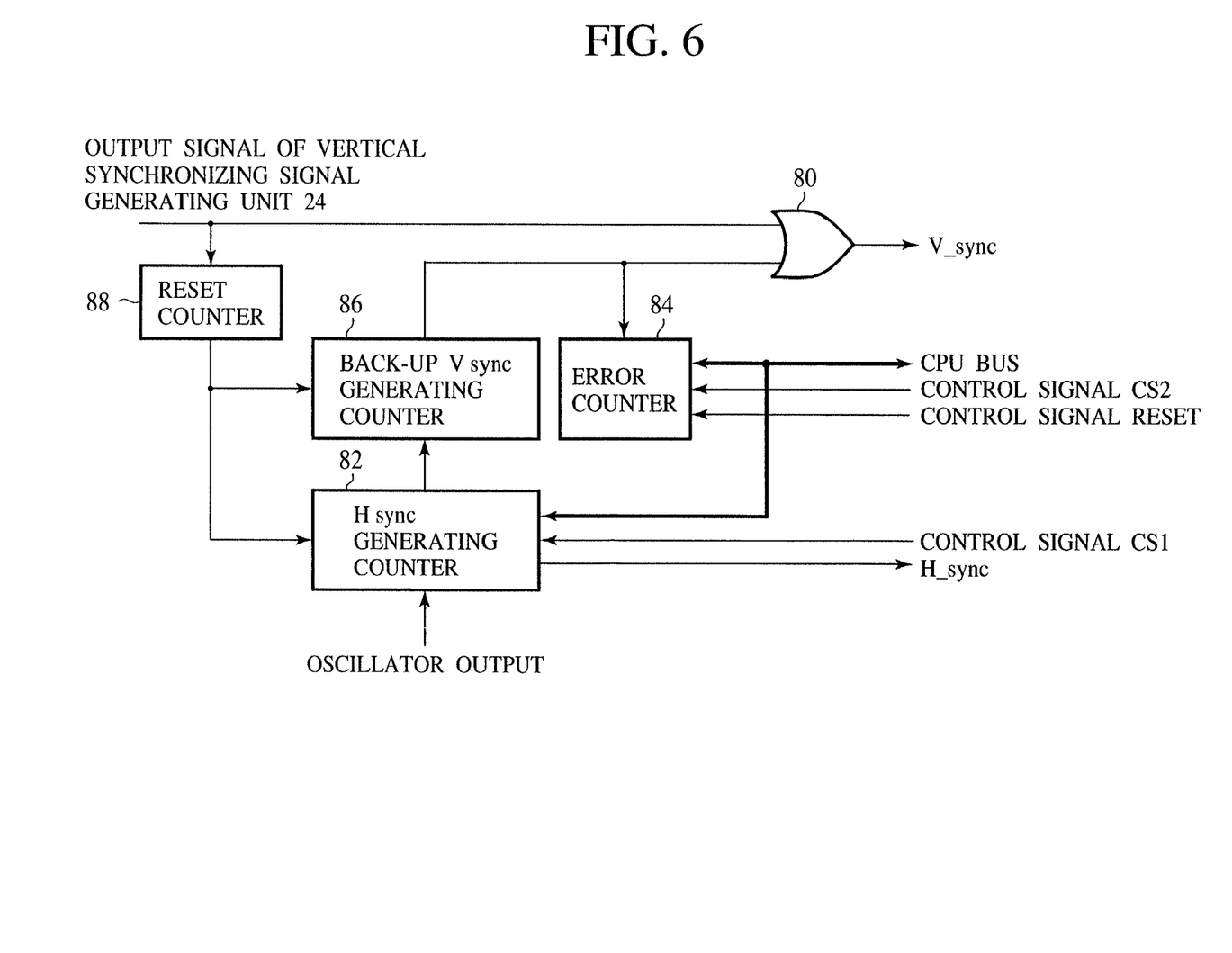
FIG. 6 is a block diagram of the V synch H synch generating circuit of the game processing units of the terminal devices of the communication system according to the embodiment of the present invention.
Figure 7:
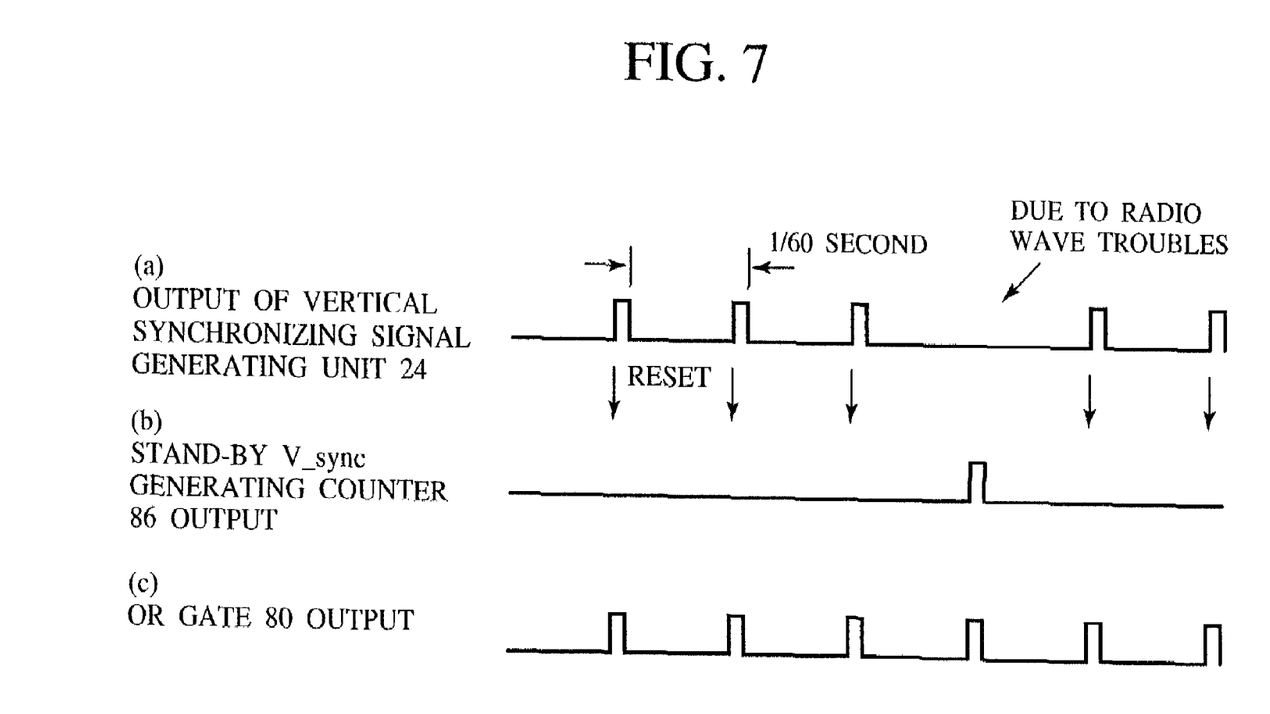
FIG. 7 is a time chart explaining the operation of the terminal devices of the communication system according to the embodiment of the present invention.
Figure 8:
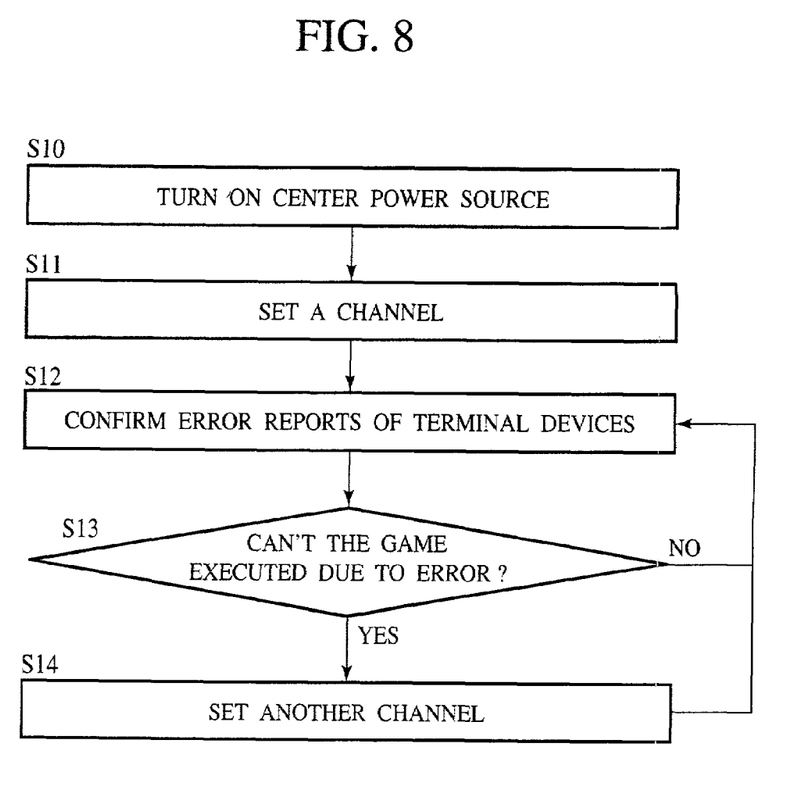
FIG. 8 is a flow chart of the operation of the center of the communication system according to the embodiment of the present invention.
Figure 9:
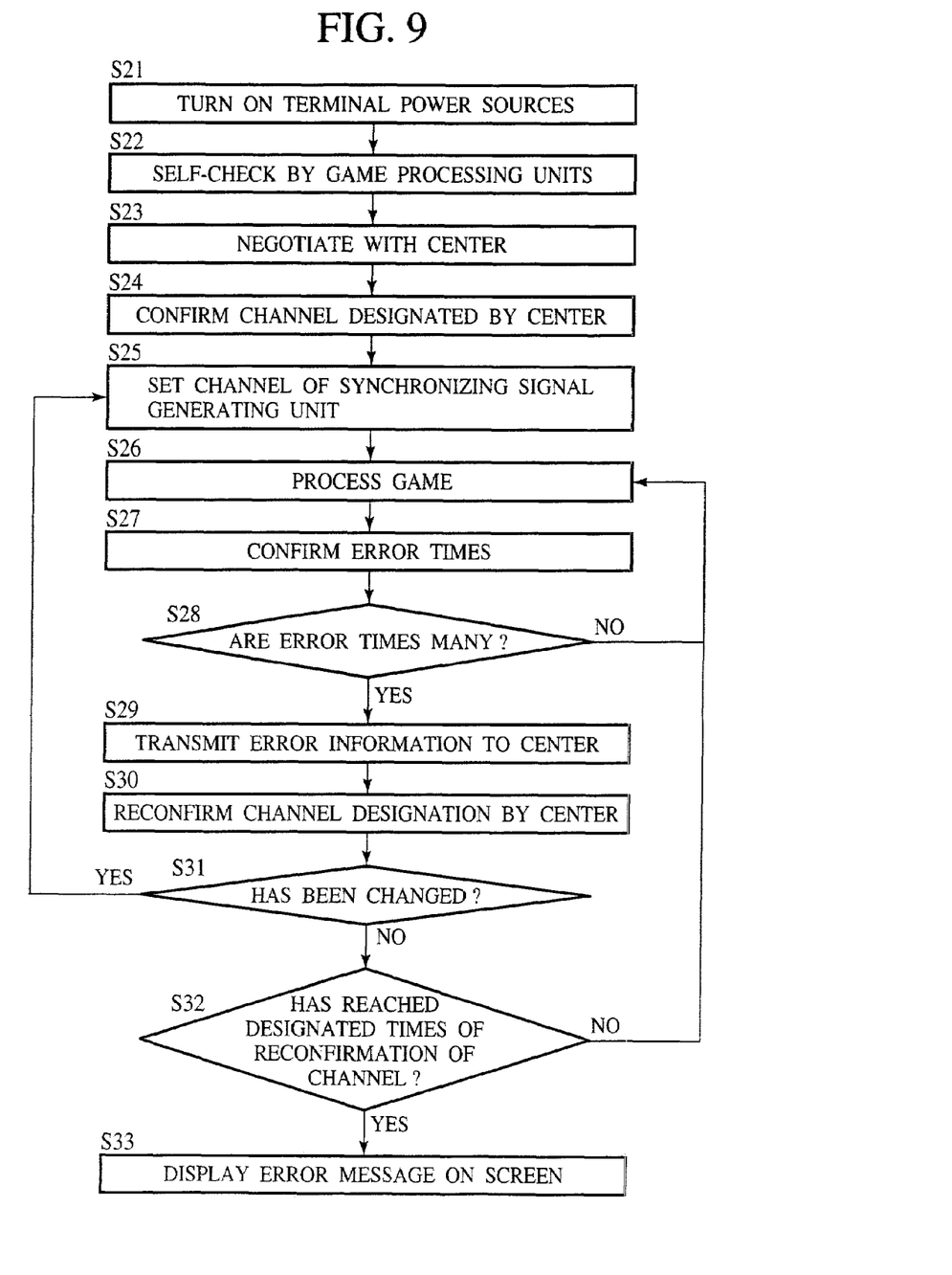
FIG. 9 is a flow chart of the operation of the terminal devices of the communication system according to the embodiment of the present invention.

The communication system according to one embodiment of the present invention will be explained with reference to FIGS. 2 to 9. FIG. 2 is a block diagram of the communication system according to the embodiment of the present invention. FIG. 3 is a block diagram of the terminal device of the communication system according to the present embodiment. FIG. 4 is a block diagram detailing the terminal device of the communication system according to the embodiment of the present invention. FIG. 5 is a block diagram of a vertical synchronizing signal generating unit of the terminal device of the communication system according to the present embodiment. FIG. 6 is a block diagram of a V sync H sync generating circuit of a game processing unit of the terminal device f the communication system of the present embodiment. FIG. 7 is a time chart of an operation of the terminal device of the communication system according to the present embodiment, which explains the operation. FIG. 8 is a flow chart of an operation of the center of the communication system according to the present embodiment, which explains the operation. FIG. 9 is a flow chart of an operation of the terminal device of the communication system according to the present embodiment.

The communication system according to the present embodiment is diagrammatically shown in FIG. 2. The communication system according to the present embodiment is for playing a network game. Networks 12, 14 are formed respectively by a plurality of terminal devices 10. The networks 12 and the network 14 are interconnected to each other, and all the terminal devices 10 constitute one network. Receipt and transmission of information among the terminal devices 10 are made through the networks 12, 14.

According to the present embodiment, as shown in FIG. 3, each terminal device 10 comprises a game processing unit 20 for operating a network game, a television tuner 22 for receiving television signals of ground waves, and a synchronizing signal generating unit 24 for generating synchronizing signals from the television signals. Television signals received by the television tuner 22 are filtered by the synchronizing signal generating unit 24 in order to extract a vertical synchronizing signal, the vertical synchronizing signal being outputted to a game processing unit 20. The game processing unit 20 makes data processing and image processing in the unit of a frame. The game processing unit 20 is connected to the associated network 12, 14.

The television tuner 22 of the respective terminal devices 10 are set to receive television signals of the same channel. The terminal devices 10, even when they are geographically spaced from each other, receive the common television signals to extract vertical synchronizing signals from the television signals, whereby the game processing units 20 of the respective terminal devices 10 can make data processing and image processing in synchronization with each other.

FIG. 4 details each terminal device 10. The game processing unit 20 comprises a main CPU 30 for generally controlling the terminal device 10, a memory 32, and an image processing unit 34 for generating an image for each frame. The image processing unit 34 is connected to a video RAM 36 used in image processing. The image processing unit 34 is connected to a television monitor 40 through a video encoder 38. The video encoder 38 digital-analog converts digital signals from the image processing unit 34 to output the signal to the television monitor 40.

The game processing unit 20 comprises an oscillator 42 for generating clock signals which are a reference for the game processing unit 20. The vertical synchronizing signal (V sync) and horizontal synchronizing signal (H sync) generating circuit 44 counts clock signals from the oscillator 42 to generates horizontal synchronizing signals and vertical synchronizing signals. The horizontal synchronizing signals and the vertical synchronizing signals are outputted to the image processing unit 34 and the main CPU 30.

The main CPU 30 controls the image processing unit 34, the vertical synchronizing signal generating unit 24, the V sync H sync generating circuit 44 to generally control the communication of the game processing unit 20. The vertical synchronizing signal from the vertical synchronizing signal generating unit 24 resets the V sync H sync generating circuit 44. Thus, the game processing unit 20 makes data processing and image processing in synchronization with television signals supplied from the outside.

FIG. 5 details the television tuner 22 and the synchronizing signal generating unit 24. Television signals are received by a TV antenna 50. The television signals are inputted to a high-frequency amplifying circuit 54 via an impedance matching circuit 52. Television signals are weakened while propagating. Television signals are amplified by the high-frequency amplifying circuit 54. The amplified signals are multiplied with signals of a frequency of a local oscillator (VCO) 56 by a mixer 58. Channel data and control signals from the main CPU 30 are converted by a D/A converter 60 to be inputted to the local oscillator (VCO) 56.

The waveform given by the multiplication by the mixer 58 contains a sum and a difference between an amplified waveform and a frequency of the local oscillator 56. The sum and the difference are removed by an intermediate frequency filter 62. The signals filtered by the intermediate frequency filter 62 are amplified by the intermediate frequency amplifying circuit 64. The amplified signals are phase-detected by a video signal wave detecting circuit 66, and composite signals containing vertical synchronizing signals, horizontal synchronizing signals, bast signals and color signals are generate.

The composite video signals are separated by the synchronization separating circuit 68 into vertical synchronizing signals and horizontal synchronizing signals. The synchronization separating circuit 68 includes a low-pass filter (LPF) 70 and a clamp circuit 72 and a comparator 74. Out of the vertical synchronizing signals and the horizontal synchronization signals separated by the synchronization separating circuit 68, the vertical synchronizing signals are separated by the vertical synchronizing signal separating circuit 76 to be outputted as reset signals. The vertical synchronizing signal separating circuit 76 includes a secondary active filter.

FIG. 6 details the V sync H sync generating circuit 44 of the game processing unit 20. Normally, vertical synchronizing signals (V sync) outputted by the vertical synchronizing signal generating unit 24 are outputted as they are to the image processing unit 34 via an OR gate 80 to be used as vertical synchronizing signals in the game processing unit 20. The vertical synchronizing signals of the vertical synchronizing signal generating unit 24 are also output to a reset circuit 88. Reset signals synchronized with the vertical synchronizing signals are outputted to a H sync counter 82 and also to a back-up V sync generating counter 86.

The H sync counter 82 is reset in synchronization with a vertical synchronizing signal from the vertical synchronizing signal generating unit 24 and counts output signals of the oscillator 42 to output horizontal synchronizing signals (H sync). The back-up V sync generating counter 86 counts horizontal synchronizing signals from the H sync counter 82 to generate back-up vertical synchronizing signals. However, the output of the generated vertical synchronizing signals is retained when a reset signal is inputted by the reset circuit 88. When the vertical synchronizing signal generating unit 24 fails to extract vertical synchronizing signals, a reset signal of the reset circuit 88 is not outputted, and back-up vertical synchronizing signals of the back-up V sync generating counter 86 are outputted to the OR gate 80. The back-up vertical synchronizing signals are outputted also to an error counter 84, and times of the back-up vertical synchronizing signals having compensated vertical synchronizing signals are counted. The main CPU 30 can read counted values of the error counter 84.

As shown in FIGS. 7A and 7B, when vertical synchronizing signals have been extracted by the vertical synchronizing signal generating unit 24, reset signals prohibit the back-up V sync generating counter 86 from outputting back-up vertical synchronizing signals. However, when vertical synchronizing signals cannot be temporarily extracted from television signals due to radio wave troubles, etc., no reset signal is outputted, and back-up vertical synchronizing signals generated by the back-up V sync generating counter 86 are outputted to the OR gate. Even when television signals are disturbed due to radio wave troubles, etc., stable vertical synchronizing signals are constantly outputted by the OR gate 80.

Then, the operation of the communication system according to the present embodiment will be explained with reference to the flow charts shown in FIGS. 8 and 9. Although not shown in FIG. 2, a center for administering all the terminal devices 10 connected to the networks 12, 14 is provided.

The flow chart of FIG. 8 shows the operation of the center. First, the power source of the center is turned on (Step S10). Then, a channel of television signals to be used is set (Step S11). Next, error reports of the terminal devices 10 are confirmed (Step S12), and it is judged whether or not the errors will disable the execution of a game (Step S13). When it is judged impossible to execute the game due to the errors, another channel is set as television signals to be used (Step S14). Then, the processing is returned to the step S12, and error reports of the terminal devices 10 are waited. Even when it is judged impossible to execute the game, the processing is returned to the step S12 to watch error reports of the terminal devices 10.

The flow chart of FIG. 9 shows the operation of the terminal devices. First, the power source of each terminal device 10 is turned on (Step S21). Next, the game processing unit 20 makes self-check (Step S22). Then, the terminal devices negotiate communication with the Center through the networks 12, 14 (Step S23). When the terminal device 10 can be connected with the center by the communication, the terminal device 10 confirms a channel designated by the center (Step S24). Then, the channel is set in the synchronizing signal generating unit 24 (Step S25).

When a channel is set, vertical synchronizing signals are extracted from the television signals of the channel and in synchronization with the vertical synchronizing signals, the processing of the game is executed by data processing and image processing for respective frames (Step S26).

While the processing of the game is being executed, a counted values of the error counter 82 are counted at a prescribed time interval (Step S27). It is judged whether error times are many, the error information is transmitted to the center (Step S29). Subsequently, the channel designated by the center is re-confirmed (Step S30). When the channel designated by the center is changed, the processing is returned to Step S25 to set another channel of the synchronizing signal generating unit 24.

When the channel designated by the center has not been changed, it is judged whether or not the re-confirmation of the channel has reached a specified time (Step S32). When the re-confirmation has not reached the specified time, the processing is returned to Step S26 to continue the game processing. When the re-confirmation has not reached the specified time, an error message is displayed on the screen of the terminal device 10 to stop the game processing (Step S33)

As described above, according to the present embodiment, the respective terminal devices receive television signals of the same channel and extract vertical synchronizing signals from the television signals, whereby the respective terminal devices can make data processing and image processing in synchronization with one another. Unless synchronizing signals can be temporarily extracted from television signals due to radio wave troubles, etc., the synchronizing signals can be supplied at substantially correct timings.

The present invention is not limited to the above-described embodiment and can cover other various modifications. In the above-described embodiment, television signals of ground waves are used as reference signals for generating synchronizing signals. However, television signals of satellite broadcasting, such as BS broadcasting, CS broadcasting or others, or television signals of CATV broadcasting may be used. The television signals may be analog or digital signals. The reference signals can be broadcasting signals other than television signals. Other than the broadcasting signals, time reference signals used in electric wave clocks, etc., or signals, such as a.c. source signals, etc., which can be time reference may be used.

In the above-described embodiment, the tuner used exclusively for receiving the broadcasting signals as the reference signals is provided. Instead, an external input terminal is provided, and the broadcasting signals may be inputted to the external input terminal. For example, in a case where a television monitor is used for games, the broadcasting signals may be inputted to the television monitor.

In the above-described embodiment, the communication system is for playing network games but can be for making any processing other than games as long as the communication system comprises a plurality of terminal devices connected to networks.

As described above, according to the present invention, based on synchronizing signals extracted from signals inputted from the outside other than the respective terminal devices, synchronous operation of the respective terminal devices and data communication among the terminal devices are performed, whereby timings of the communication among a plurality of terminal devices forming a network or others can be suitably synchronized.

What is claimed is:

1. A terminal devices synchronizing method for synchronizing a plurality of terminal devices interconnected through a network,
   Each of said plurality of respective terminal devices comprising vertical synchronizing signal generating means for generating vertical synchronizing signals, and control means for making synchronization control operations and data communication, based on the vertical synchronizing signals, respectively, wherein
   the vertical synchronizing signal generating means comprises a vertical synchronizing counter, a horizontal synchronizing counter, and a reset circuit for resetting both the vertical synchronizing counter and the horizontal synchronizing counter,
   the respective terminal devices extract a synchronizing signal from signals wirelessly inputted from the outside other than the respective terminal devices,
   when the synchronizing signal is extracted, the reset circuit of the respective terminal devices reset both the vertical synchronizing counter and the horizontal synchronizing counter in synchronization with the synchronizing signal, and the vertical synchronizing signal generating means of the respective terminal devices output the synchronizing signal as a vertical synchronizing signal,
   when the synchronizing signal is not extracted, the vertical synchronizing signal generating means of the respective terminal devices output a back-up vertical synchronizing signal, and
   the control means of the respective terminal devices make synchronization control operation and data communication, based on the vertical synchronizing signal or the back-up vertical synchronizing signal.

2. A terminal devices synchronizing method according to claim 1, wherein
   the respective terminal devices make the synchronization control, based on synchronizing signals extracted from broadcasting signals of the same channel.

3. A terminal devices synchronizing method according to claim 2, wherein
   when it is difficult to extract the synchronizing signals from the broadcasting signals in one of the respective terminal devices, the channel of the broadcasting signals is changed.

4. A communication system comprising a plurality of terminal devices interconnected through a communication line, wherein
   each of the respective terminal devices make synchronization control by a terminal synchronizing method,
   the respective terminal devices comprise vertical synchronizing signal generating means for generating vertical synchronizing signals, and control means for making synchronization control operations and data communication, based on the vertical synchronizing signals, respectively, wherein
   the vertical synchronizing signal generating means comprises a vertical synchronizing counter, a horizontal synchronizing counter, and a reset circuit for resetting both the vertical synchronizing counter and the horizontal synchronizing counter,
   the respective terminal devices extract a synchronizing signals from signals wirelessly inputted from the outside other than the respective terminal devices,
   when the synchronizing signal is extracted, the reset circuit of the respective terminal devices reset both the vertical synchronizing counter and the horizontal synchronizing counter in synchronization with the synchronizing signal, and the vertical synchronizing signal generating means of the respective terminal devices output the synchronizing signal as a vertical synchronizing signal,
   when the synchronizing signal is not extracted, the vertical synchronizing signal generating means of the respective terminal devices output a back-up vertical synchronizing signal, and
   the control means of the respective terminal devices make synchronization control operation and data communication, based on the vertical synchronizing signal or the back-up vertical synchronizing signal.

5. A communication system according to claim 4, wherein
   wherein the respective terminal devices make the synchronization control, based on synchronizing signals extracted from broadcasting signals of the same channel.

6. A communication system according to claim 5, wherein
   when it is difficult to extract the synchronizing signals from the broadcasting signals in one of the respective terminal devices, the channel of the broadcasting signals is changed.

7. A terminal device interconnected to another terminal device through a network, the terminal device comprising:
   a vertical synchronizing signal generating means for generating vertical synchronizing signals, and control means for making synchronization control operations and data communication, based on the vertical synchronizing signals, wherein
   the vertical synchronizing signal generating means comprises a vertical synchronizing counter, a horizontal synchronizing counter, and a reset circuit for resetting both the vertical synchronizing counter and the horizontal synchronizing counter, the terminal device further comprises a synchronizing signal generating means for extracting synchronizing signals from signals wirelessly inputted from the outside other than said another terminal device, when the synchronizing signal is extracted, the reset circuit resets both the vertical synchronizing counter and the horizontal synchronizing counter in synchronization with the synchronizing signal, and the vertical synchronizing signal generating means outputs the synchronizing signal as a vertical synchronizing signal, when the synchronizing signal is not extracted, the vertical synchronizing signal generating means outputs a back-up vertical synchronizing signal, the control means makes synchronization control operation and data communication, based on the vertical synchronizing signal or the back-up vertical synchronizing signal.

* * * * *